United States Patent [19]

Moya

[11] Patent Number: 5,814,372
[45] Date of Patent: Sep. 29, 1998

[54] PROCESS FOR FORMING POROUS COMPOSITE MEMBRANE

[75] Inventor: Wilson Moya, Derry, N.H.

[73] Assignee: Millipore Corporation, Bedford, Mass.

[21] Appl. No.: 718,980

[22] Filed: Sep. 26, 1996

Related U.S. Application Data

[62] Division of Ser. No. 545,230, Oct. 19, 1995, Pat. No. 5,629,084.

[51] Int. Cl.$^6$ .................. B32B 3/26; B32B 5/14
[52] U.S. Cl. .............. 427/245; 427/353; 427/373; 427/384
[58] Field of Search ............... 427/245, 353, 427/373, 384

[56] References Cited

U.S. PATENT DOCUMENTS 4,113,912  9/1978  Okita ...................... 428/315.5
4,618,533  10/1986  Steuck ..................... 428/315.7

Primary Examiner—Marion E. McCamish
Assistant Examiner—Elizabeth M. Cole
Attorney, Agent, or Firm—John Dana Hubbard; Timothy J. King; Paul J. Cook

[57] ABSTRACT

A composite porous membrane is provided which comprises a porous membrane substrate having an average pore size between 0.01 and 10 microns formed of a first polymer which is coated over its entire surface with a crosslinked second polymer. The second polymer is dissolved in a solvent with a free radical polymerization initiator in the absence of a crosslinking agent. The second polymer is crosslinked in situ and rendered insoluble by mild heating and/or exposure to ultraviolet light.

29 Claims, No Drawings

5,814,372

PROCESS FOR FORMING POROUS COMPOSITE MEMBRANE

This is a divisional of application Ser. No. 08/545,230, filed on Oct. 19, 1995, now U.S. Pat. No. 5,629,084.

BACKGROUND OF THE INVENTION

This invention relates to a porous composite membrane and to a process for making the porous composite membrane. More particularly, this invention relates to a porous composite membrane having a porous substrate and a modified surface wherein the composite membrane has essentially the same porous configuration as the porous substrate.

Presently, porous membranes are utilized for a variety of purposes including filtration. Membranes having a hydrophobic surface are utilized to filter compositions having a nonaqueous diluent or solubilizer liquid. Porous membranes having a hydrophilic surface are important in filtration applications which require the passage of water or aqueous process fluids through the membranes to remove unwanted materials in the aqueous fluids while avoiding the need for special wetting agents. It is also desirable that these membranes have good mechanical properties, good chemical resistance, good permeability and high retention. Hydrophilic membranes also may be charged (cationically or anionically) or neutral by controlling the chemical composition of the membrane substrate or by controlling the chemical composition of the superstrate or coating in the case of composite porous membranes. In any case, it is desirable that the entire surface of the composite membrane be modified with the desired surface characteristic and that the composite membrane have essentially the same porosity characteristics as the unmodified porous substrate. That is, the pores of the composite membrane should not be plugged so that he composite membrane retains its desired permeability.

Membranes having a neutral hydrophilic surface have no specific affinity for charged matter and therefore can be used in filtration applications such as is found in the pharmaceutical industry in which low binding of biological materials such as proteins, nucleic acids, or peptides by the membrane is desired. In contrast, charged membranes can be specifically modified to interact with dissolved and/or suspended charged matter to repel or bind materials having the same or opposite charge as the membrane. In filtration applications, canonically charged membranes having a hydrophilic surface are capable of removing unwanted negatively charged materials of smaller dimensions than the rated pore size of the membrane through charge interactions rather than by typical sieving mechanisms. This characteristic is particularly useful in the production of high purity water used in the microelectronics industry where maximum particle retention as well as high flux are desired. Membranes having a cationically charged surface also are used in the biotechnology industry where membranes are used to bind and immobilize biomolecules such as nucleic acids, peptides, proteins or the like in blotting applications. Anionically charged membranes may be used in a fashion similar to cationically charged membranes or as ion exchange materials for electrolytic applications.

It is desirable to provide membranes having a modified surface from which extractables are minimized or eliminated. By preventing the introduction of extractables from the membrane into the fluid being passed through the membrane, purity of the fluid is maintained.

It has been proposed in U.S. Pat. No. 4,618,533 to form a composite membrane by coating a porous membrane substrate with a polymerizable monomer, a free radical initiator and a crosslinking agent. The monomer is polymerized and cross-linked in situ to form a cross-linked second polymer as a superstrate which can comprise a hydrophilic coating. The composite membrane thus formed has essentially the same porous configuration as the porous membrane substrate. Over time, the cross-link bonds may become degraded which can result in the loss of the coating or superstrate and the formation of molecular species that are extractable into fluids being processed through the composite membrane.

U.S. Pat. No. 4,113,912 discloses a composite porous structure having a hydrophilic surface comprising a porous fluorocarbon resin substrate with pores containing at least one water soluble polymer which has been water-insolubilized. Suitable water soluble polymers that are water insolubilized include polyvinyl alcohol, polyethylene oxide or polyacrylic acid. The water soluble polymer is rendered water insoluble by a heat treatment in the absence of a polymerization initiator, chemical reaction with crosslinking agents resulting in acetalization or esterification, chemical reaction with potassium bichromates as crosslinking agents or by cross linking with ionizing radiation but in the absence of a polymerization initiator. Suitable heat treatments disclosed are 150°–160° C. for about 4–6 minutes or 200° C. for about 1 minute. The use of these high temperatures, while necessary to effect crosslinking are undesirable since they can cause degradation of the substrate, particularly low melting substrates such as polyethylene. In addition, the use of ionizing radiating can cause substrate degradation. The use of the chemical crosslinking reagents also may result in bonds which become degraded thereby leading to undesirable extractables and loss of the coating or the superstrate.

It has also been disclosed by Sanderson in Desalination, 90 (1993) page 15–29 that an insoluble nonporous base layer of a reverse osmosis membrane which has little or no porosity can be formed from water isolubilized polyvinyl alcohol.

Accordingly, it would be desirable to provide a composite porous membrane having a small average pore size and which has a completely modified surface which can be hydrophilic or hydrophobic and which retains substantially the same porous configuration as the porous substrate. In addition, it would be desirable to provide such a membrane while avoiding degradation of the membrane substrate and the production of extractables.

SUMMARY OF THE INVENTION

The present invention provides a composite porous membrane having an average pore size of between about 0.01 and about 10 microns formed from a porous polymeric substrate and a second polymer which has been cross-linked by heat or ultraviolet light (UV) in the absence of a crosslinking agent. The composite porous membrane is modified over its entire surface and is substantially free of extractables which can be dissolved in a liquid being processed through the membrane. The composite porous membrane retains he bulk properties of the porous membrane substrate while retaining a permanently modified surface over its entire surface. The modified surface can be hydrophilic or hydrophobic, electrically neutral or can be charged anionically or cationically.

The composite porous membrane of this invention is formed from a porous membrane substrate which can have either a hydrophilic or hydrophobic surface. The membrane is contacted over its entire surface with a solution of a polymerization initiator and a second polymer which can be rendered insoluble. The second polymer is rendered insoluble by either mild heating, by exposure to UV light or by both mild heating and exposure to UV light. Excess second polymer and the polymerization initiator are removed from the composite porous membrane by rinsing. The composite porous membrane then is dried. The composite porous membrane is modified over its entire surface and retains essentially the same porous configuration as the porous substrate. Since the use of crosslinking agents is avoided and since the composite porous membrane is rinsed to remove excess second polymer and polmerization initiator, it is substantially free of extractables. It has been found that the use of mild heat and/or UV light avoids plugging of the substrate pores with the polymer surface coating.

DESCRIPTION OF SPECIFIC EMBODIMENTS

In accordance with this invention, a porous polymeric membrane substrate having a small average pore size of between about 0.01 and 10 microns and having desired bulk properties is directly coated over its entire surface with an initially soluble polymer such as a water soluble polymer, which is crosslinked in situ with a polymerization initiator on the substrate in the absence of a cross linking agent. The soluble polymer is crosslinked and rendered insoluble by mild heat, UV light or mild heating and UV light. The polymerization initiator and excess soluble polymer are removed from the composite porous membrane by washing with a suitable solvent. The resultant composite membrane is coated over its entire surface with a crosslinked second polymer which is rendered insoluble by the crosslinking. The polymerization initiator which initiates the self crosslinking of the polymer is essentially not chemically bound to the coating. Thus it can be removed, together with excess uncrosslinked polymer from the coating by washing in a suitable solvent. The resultant composite product is modified over its entire surface while retaining substantially the same porous configuration as the original porous substrate.

In the process of this invention, the porous substrate which is either hydrophilic or hydrophobic is contacted over its entire surface with a dilute solution of a soluble crosslinkable polymer, a polymerization initiator and a solvent for the polymer and polymerization initiator. The polymer is then crosslinked and rendered insoluble by exposing the polymer and polymerization initiator in solution to either mild heating, UV light or both mild heating and UV light. High heat, as an energy source which evaporates the solvent is desirable. For example, when utilizing water as the solvent, a solution temperature in excess of 100° C. at atmospheric pressure is undesirable. In addition, high heat can cause the porous substrate to be degraded or melted. The use of other high energy sources such as electron beam energy also is avoided so that the porous substrate is not rendered degraded. It has been found that the utilization of mild heating below about 100° C. or UV light as the energy source to effect cross-linking permits the formation of composite membranes having an average pore size of between about 0.01 and 10 microns having the entire surface coated with the crosslinked polymer while avoiding plugging of the substrate membrane pores. The use of a polymerization initiator permits utilizing these mild heating temperatures. In addition, the avoidance of the use of a crosslinking agent permits the formation of composite porous membranes which are substantially free of extractables over the useful life of the membrane.

The porous membrane substrate can be in the form of a flat sheet, hollow fiber, tube or the like and can be formed from a semi-crystalline or amorphous polymer which can be hydrophilic or hydrophobic. Representative suitable polymers for forming the porous substrate include polyolefins such as polyethylene, polypropylene, polymethylpentene or the like; polystyrene or substituted polystyrenes; fluorinated polymers including poly (tetrafluoroethylene), polyvinylidene fluoride, perfluoroalkoxy resins or the like; polysulfones such as polysulfone, polyethersulfone or the like; polyesters including polyethylene terephthalate, polybutylene terephthalate or the like, polyacrylates, polyether ether ketones, and polycarbonate; vinyl polymers such as polyvinyl chloride and polyacrylonitriles; cellulose and cellulose esters such as acetate or cellulose nitrate; polyimides, polyetherimides, hydrophilic polymers including polyamides such as Nylon 66 or Nylon 6 or the like. Copolymers also can be employed such as copolymers of butadiene and styrene, fluorinated ethylene-propylene copolymer, ethylene-chlorofluoroethylene copolymer or the like. The porous membrane substrate has an average pore size of between about 0.01 and 10 microns, and more usually between about 0.05 and 5 microns and more usually between about 0.1 and 1.0 microns.

Any crosslinkable polymer or mixture of such polymers comprising a polymer composition can be utilized to form the crosslinked insoluble coating of the composite porous membrane of this invention. Representative suitable polymers, include water soluble polymer such as polyvinyl alcohol, polyvinylpyrrolidones, polyacrylamide, polyacrylic acid, polymethacrylic acid, polyvinyl methyl ether, polyvinyl formamide, polyvinylamine, polyvinyl phosponic acid, polyvinylalcohol-co-vinyl amine, poly-4-vinyl pyridine, polypropylene oxides, polyethylene oxides, mixtures thereof or the like or organic solvent soluble polymers such as polyamides, polyvinyl acetate, polystyrene, polyacrylonitrile, or the like.

A suitable free radical polymerization initiator in accordance with this invention functions to initiate the crosslinking reaction but essentially does not form a portion of the crosslinked polymer. In addition, the polymerization initiator functions when expose to UV light and/or to mild heating of less than the boiling point of the solvent for the soluble polymer and preferably less than about 100° C. Furthermore, the polymerization initiator should be soluble so that it can be easily removed from the composite membrane by rinsing in a suitable solvent. Suitable free radical polymerization initiators include ammonium persulfate, potassium persulfate, sodium persulfate, potassium peroxydiphosphate, benzophenone, benzoyl peroxide or the like.

In one aspect of this invention the solution of the second polymer also can contain at least one polymerizable monomer which is polymerized under the conditions which the second polymer becomes crosslinked, and becomes an integral portion of the coating or superstrate. The polymerizable monomer is utilized to modify the characteristics of the crosslinked polymer such as by introducing anionic or cationic charges or by introducing specific functional groups such as hydroxyl, carboxyl, amine, amide, or the like. Representative suitable polymerizable monomers include N-vinyl pyrrolidone, acrylic acid, methacrylic acid, diallyldimethylammonium chloride, vinyl sulfonic acid, vinyl phosphonic acid, hydroxy propyl acrylate, vinyl acetate, styrene or the like. The second polymer is present in the solution at a concentration between about 0.01 and 20 weight percent, preferably between about 0.1 and 5 weight percent based upon the weight of the solution. The polymerization inhibitor is present in the solution at a concentration of between about 0.1 and 30 weight percent, preferably between about 1 and 20 weight percent based upon the weight of the solution. When one or more modifying monomers are utilized, the monomer constituent comprises between about 1 and 10,000 weight percent based on the weight of the second polymer. Relatively high concentrations of monomer can be utilized generally when the rate of monomer polymerization is low. Excess unpolymerized monomer is removed by rinsing after polymerization. The polymer solution may contain additives such as salts, acids, bases, solvents, etc. to provide better control over experimental conditions such as pH or solvent power.

Crosslinking is effected in the absence of oxygen such by positioning the porous substrate impregnated with a solution of the second polymer between two sheets, or in an inert atmosphere such as nitrogen. Crosslinking is effected either with UV light or by mild heating at a temperature less than about 100° C. and preferably between about 45° and 95° C. When utilizing mild heat as the energy source, crosslinking is essentially completed after a period of time of between about 0.5 and 60 minutes, usually between about 1 and 5 minutes. Exposure to UV light can be effected at room temperature for a time usually between 1 to 60 seconds usually between 5 and 20 seconds. Crosslinking also can be effected by utilizing both mild heat and exposure to UV light. Upon completion of the crosslinking, the polymerization initiator and excess uncrosslinked polymer and excess monomer, if present, are removed from the composite porous membrane by rinsing in a suitable solvent. When the composite porous membrane is dried, it has essentially the same porous configuration as the original porous substrate. When utilizing porous substrate having an average pore size less than about 0.1 micron, changes in permeability occur as compared to the substrate due to swelling of the second polymer coating. However, in the dry state the composite has essentially the same porous configuration as the porous substrate.

The following examples illustrate the present invention and are not intended to limit the same.

The composite membranes set forth in Table 1 were prepared under the conditions set forth in examples 1–11 set forth below. With the exception of polyamide (PAm), all of the original polymeric substrates were hydrophobic.

The hydrophobic substrates were first wet with alcohol then with water to displace the alcohol, to measure water permeabilities.

PVDF=polyvinylidine fluoride
PE=polyethylene
PTFE=polytetrafluoroethylene
PAm=polyamide
PP=polypropylene
UF=ultrafiltration membrane
NW=nonwoven fabric
HF=hollow fiber
PVAl=polyvinyl alcohol
PVAm=polyvinyl amine
PVAl-co-VAm=copolymer of PVAl and PVAm
PAA=polyacrylic acid
PVP=polyvinyl pyrrolidone
PVPA=polyvinyl phosphonic acid
DADMAC=diallyldimethylammonium chloride

I. EXAMPLES 1 2, 3, 4, 8, AND 9

The porous substrate was first immersed in methyl alcohol to wet the porous substrate. The wet porous substrate then was wet with water to displace the alcohol with water. The porous substrate wet with water then was immersed in an aqueous polymer solution containing 1 wt % modifying polymer of Table 1 and 10 wt % ammonium persulfate. The porous substrate coated with the polymer solution then was placed between two sheets of polyethylene to prevent exposure of the polymer solution to oxygen. The porous substrate-polyethylene sheet sandwich then was exposed to UV light at a constant speed of 7.5 to 10 feet per minute to provide a UV exposure time of about 5 sec. to about 10 sec. to effect crosslinking of the modifying polymer. The composite porous membrane produced was removed from contact with the polyethylene sheets and was immersed in water for about 5 to 10 minutes to rinse off excess polymer and/or polymerization initiator. The rinsed modified substrate then was air dried at room temperature.

II. EXAMPLE 5

The procedure was the same as I above except that the initial steps of contact with alcohol followed by contact with water were omitted since the porous substrate was spontaneously wetted by the polymer solution. Also, the concentration of the coating polymer was 0.25 wt %.

III. EXAMPLE 6

The procedure was the same as I above except that the polymerization initiator was sodium persulfate.

TABLE 1

| Example No. | Substrate Pore Size | Substrate Polymer | Modifying Polymer(s) | Additional Modifying Monomer | Weight gain upon modification (%) | Substrate Water Permeability cm/(sec.Pa) | Composite Membrane Water Permeability cm/(sec.Pa) | Hydrophilic |
|---|---|---|---|---|---|---|---|---|
| 1 | 0.01 μm | PVDF(UF) | PVAl-co-VAm | | 1.7 | $2.82 \times 10^{-7}$ | $1.30 \times 10^{-7}$ | YES |
| 2 | 0.1 μm | PE | PVAm | | 6.3 | $8.16 \times 10^{-7}$ | $8.14 \times 10^{-7}$ | YES |
| 3 | 0.2 μm | PTFE | PVP | | 3.0 | $4.20 \times 10^{-6}$ | $2.77 \times 10^{-6}$ | YES |
| 4 | 0.2 μm | PTFE | PVAl | | 4.0 | $4.20 \times 10^{-6}$ | $3.02 \times 10^{-6}$ | YES |
| 5 | 0.45 μm | PAm | PAA | | 0.5 | $3.96 \times 10^{-6}$ | $3.61 \times 10^{-6}$ | YES |
| 6 | 0.2 μm | PE | PAA | | 2.2 | $2.80 \times 10^{-6}$ | $2.30 \times 10^{-6}$ | YES |
| 7 | 0.2 μm | PVDF | PVAl/PVP | | 2.0 | $2.80 \times 10^{-6}$ | $2.05 \times 10^{-6}$ | YES |
| 8 | 0.2 μm | PE | PVPA | | 2.3 | $2.80 \times 10^{-6}$ | $1.92 \times 10^{-6}$ | YES |
| 9 | 1.0 μm | PP(NW) | PVAl-co-VAm | | 0.6 | $6.50 \times 10^{-6}$ | $4.70 \times 10^{-6}$ | YES |
| 10 | 0.2 μm | PE | PVAl | DADMAC | 3.6 | $2.80 \times 10^{-6}$ | $2.29 \times 10^{-6}$ | YES |
| 11 | 0.1 μm | PE(HF) | PAA | | 0.9 | $2.66 \times 10^{-6}$ | $2.45 \times 10^{-6}$ | YES |

IV. EXAMPLE 7

The procedure was the same as I above except the aqueous polymer solution had the following composition:
0.5 wt % polyvinyl alcohol
0.5 wt % polyvinyl pyrrolidone
10 wt % ammonium persulfate

V EXAMPLE 10

The procedure was the same as I above, except the aqueous polymer solution had the following composition.
1 wt % polyvinyl alcohol
0.6 wt % diallyldimethylammonium chloride
10 wt % ammonium persulfate

VI EXAMPLE 11

A polyethylene hollow fiber module containing 1,000 hollow fibers was contacted (in a flow through mode) with isopropyl alcohol to wet the hollow fibers. The alcohol-containing fibers then were contacted (in a flow through mode) with water to displace the alcohol. The water-containing fibers then were contacted (in a flow through mode) with an aqueous polymer solution having the following composition.
0.1 wt % polyacrylic acid
10 wt % ammonium persulfate The module then was immersed in the polymer solution which was then heated to 90° to 95° C. for about 15 minutes to effect polymer crosslinking. The modified module was removed from the polymer solution and contacted (in a flow through mode) with water for about 5 to 10 minutes to rinse off excess polymer and/or polymerization initiation. The rinsed modified module then was dried at room temperature for about 20 hours.

I claim:

1. The process for forming a composite porous membrane formed from a porous membrane substrate having an average pore size of between about 0.01 and 10 microns formed of a first polymer, said substrate being directly coated over its entire surface with an uncrosslinked self-crosslinkable second polymer composition in a solvent and which is subsequently crosslinked and rendered insoluble in situ on said substrate which comprises:
   a) impregnating said substrate with a solution of said self crosslinkable second polymer composition and a free radical polymerization initiator and in the absence of a crosslinking agent in said solvent,
   b) exposing the impregnated substrate from step a) to an energy source selected from the group consisting of ultraviolet light, a mild heat source which effects a temperature of said solution between about 45° C. and 100° C. and exposure to ultraviolet light and said mild heat source for a period of time sufficient to effect crosslinking of said second polymer composition, and to render said crosslinked second polymer composition insoluble and
   c) washing said impregnated substrate from step b) with a liquid to remove soluble polymer not rendered insoluble, excess polymerization initiator and reaction products of said polymerization initiator.

2. The process of claim 1 wherein said uncrosslinked, self crosslinkable second polymer composition is hydrophilic and said solvent is water.

3. The process of any one of claims 1 or 2 wherein said porous membrane substrate has an average pore size between about 0.05 and 5.0 microns.

4. The process of any one of claims 1 or 2 wherein said substrate has an average pore size between about 0.1 and 1.0 microns.

5. The process of any one of claims 1 or 2 wherein said uncrosslinked, self crosslinkable second polymer composition is a polymer containing hydroxyl groups.

6. The process of claim 5 wherein said uncrosslinked, self crosslinkable second polymer composition is a polyvinyl alcohol.

7. The process of any one of claims 1 or 2 wherein said uncrosslinked, self crosslinkable second polymer composition is a polymer containing nitrogen.

8. The process of claim 7 wherein said uncrosslinked, self crosslinkable second polymer composition is polyvinylpyrrolidone.

9. The process of claim 7 wherein said uncrosslinked, self crosslinkable second polymer composition is polyacrylamide.

10. The process of claim 7 wherein said uncrosslinked, self crosslinkable second polymer composition is polyvinyl amine.

11. The process of any one of claims 1 or 2 wherein said uncrosslinked, self crosslinkable second polymer composition is a polymer containing carboxyl groups.

12. The process of claim 11 wherein said uncrosslinked, self crosslinkable second polymer composition is acrylic acid.

13. The process of claim 11 wherein said uncrosslinked, self crosslinkable second polymer composition is polymethacrylic acid.

14. The process of any one of claims 1 or 2 wherein said uncrosslinked, self crosslinkable second polymer composition is a polymer containing sulfonic acid groups or phosphonic acid group.

15. The process of any one of claims 1 or 2 wherein said solution contains at least one additional polymerizable monomer and said insoluble polymer includes a polymer of said at least one additional monomer.

16. The process of any one of claims 1 or 2 wherein said first polymer is a halogenated hydrocarbon polymer.

17. The process of claim 16 wherein said first polymer is a fluorinated hydrocarbon polymer.

18. The process of claim 17 wherein said first polymer is polyvinylidene fluoride.

19. The process of claim 17 wherein said first polymer is polytetrafluorothylene.

20. The process of claim 17 wherein said first polymer is a perfluroalkoy resin.

21. The process of claim 16 wherein said polymer is polyvinyl chloride.

22. The process of any one of claims 1 or 2 wherein said first polymer is a nitrogen containing polymer.

23. The process of claim 22 wherein said first polymer is a polyamide.

24. The process any one of claims 1 or 2 wherein said first polymer is a polyolefin.

25. The process of claim 24 wherein said first polymer is polyethylene.

26. The process of claim 24 wherein said fist polymer is polypropylene.

27. The process of any one of claims 1 or 2 wherein said first polymer is a polysulfone.

28. The process of claim 27 wherein said first polymer is polyethersulfone.

29. The process of any one of claims 1 or 2 wherein said polymerization initiator comprises a persulfate.

* * * * *